US012630898B2

(12) United States Patent
Ha et al.

(10) Patent No.: US 12,630,898 B2
(45) Date of Patent: May 19, 2026

(54) METHOD FOR RECOVERING ACTIVE METAL OF LITHIUM SECONDARY BATTERY

(71) Applicant: SK INNOVATION CO., LTD., Seoul (KR)

(72) Inventors: Hyeon Bae Ha, Daejeon (KR); Ji Min Kim, Daejeon (KR); Min Ji Sung, Daejeon (KR); Sung Real Son, Daejeon (KR); Hyeon Jung Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 798 days.

(21) Appl. No.: 17/909,541

(22) PCT Filed: Mar. 4, 2021

(86) PCT No.: PCT/KR2021/002657
§ 371 (c)(1),
(2) Date: Sep. 6, 2022

(87) PCT Pub. No.: WO2021/177733
PCT Pub. Date: Sep. 10, 2021

(65) Prior Publication Data
US 2023/0140471 A1      May 4, 2023

(30) Foreign Application Priority Data
Mar. 6, 2020    (KR) ........................ 10-2020-0028136

(51) Int. Cl.
C22B 7/00         (2006.01)
C22B 1/02         (2006.01)
(Continued)

(52) U.S. Cl.
CPC ................ *C22B 7/006* (2013.01); *C22B 1/02* (2013.01); *C22B 26/12* (2013.01); *H01M 10/54* (2013.01)

(58) Field of Classification Search
None
See application file for complete search history.

(56) References Cited

U.S. PATENT DOCUMENTS 8,882,007  B1    11/2014  Smith et al.
2010/0012149  A1 *   1/2010  Arimura ............... H01M 10/54
                                                        134/184

FOREIGN PATENT DOCUMENTS

CN        102694217 A  *  9/2012
CN        106207267 A  *  12/2016  .......... H01M 10/058
(Continued)

OTHER PUBLICATIONS

English translation of KR 101897134 B1. (Year: 2018).*
(Continued)

*Primary Examiner* — Anthony J Zimmer
*Assistant Examiner* — Zachary John Baum
(74) *Attorney, Agent, or Firm* — The PL Law Group, PLLC

(57)         ABSTRACT
A method for recovering an active metal of a lithium secondary battery according to exemplary embodiments comprises preparing a preliminary cathode active material mixture including a lithium composite oxide and a binder, forming a cathode active material mixture by removing the binder from the preliminary cathode active material mixture through a heat treatment in a fluidized bed reactor, and recovering a lithium precursor from the cathode active material mixture. Accordingly, the active metal of the lithium secondary battery can be recovered with high purity and high efficiency.

10 Claims, 2 Drawing Sheets

Figure 1:
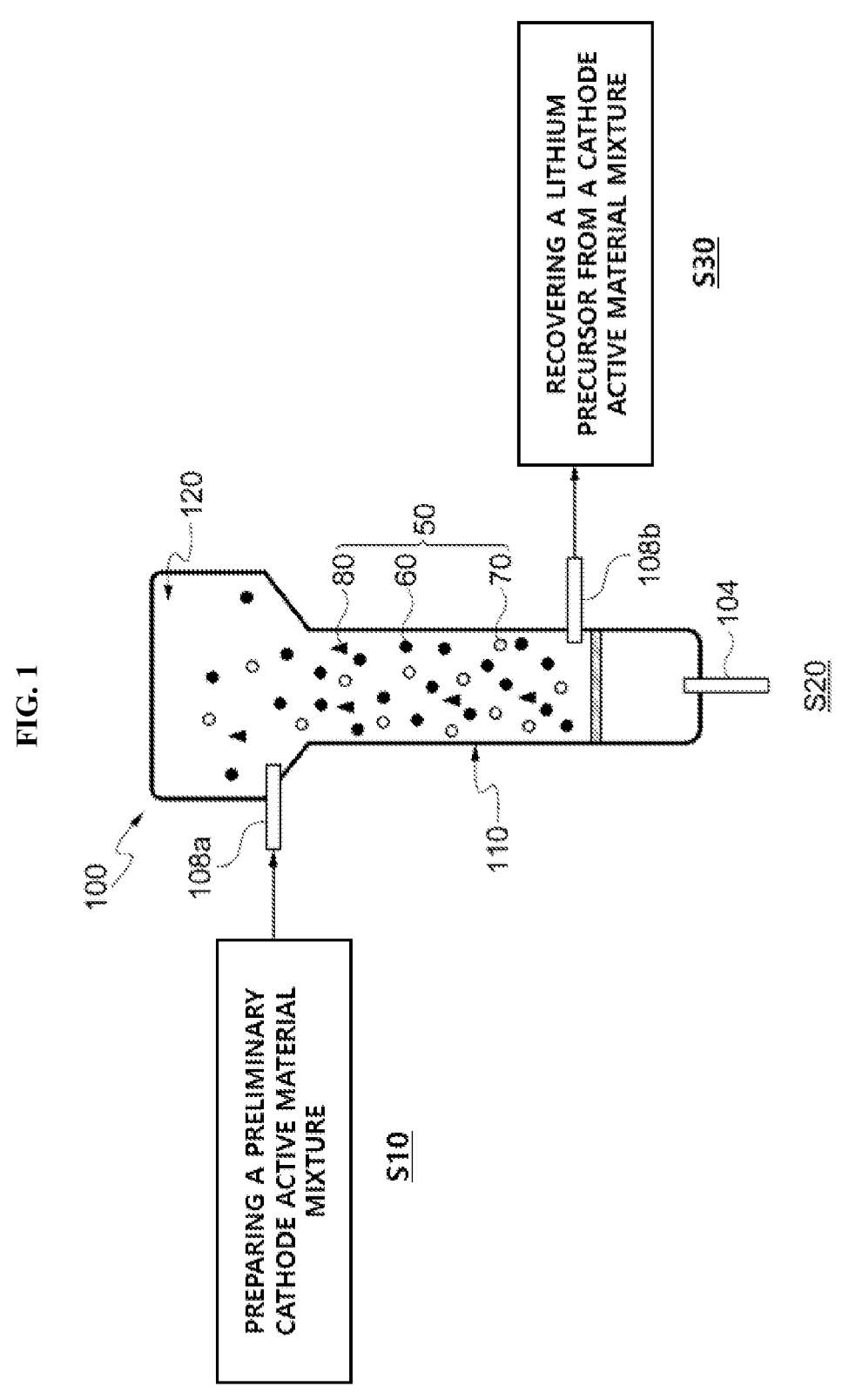

(51) Int. Cl.
  C22B 26/12 (2006.01)
  H01M 10/54 (2006.01)

(56) References Cited

FOREIGN PATENT DOCUMENTS

| CN | 107910610 A | | 4/2018 |
|---|---|---|---|
| CN | 108183277 A | | 6/2018 |
| EP | 1 981 115 A1 | | 10/2008 |
| JP | H11-97076 A | | 4/1999 |
| JP | 2012-229481 A | | 11/2012 |
| JP | 2017-084681 A | | 5/2017 |
| KR | 10-2011-0065157 A | | 6/2011 |
| KR | 10-2013-0113748 A | | 10/2013 |
| KR | 10-2015-0002963 A | | 1/2015 |
| KR | 10-2016-0098935 A | | 8/2016 |
| KR | 101897134 B1 | * | 9/2018 |
| KR | 10-2020238 B1 | | 9/2019 |
| WO | WO 2019/199014 A1 | | 10/2019 |
| WO | WO 2019/199015 A1 | | 10/2019 |
| WO | WO 2020/003602 A1 | | 1/2020 |

OTHER PUBLICATIONS

English translation of CN-102694217-A Description. (Year: 2012).*
English translation of CN-106207267-A Description. (Year: 2016).*
International Search Report for PCT/KR2021/002657 mailed on Jun. 7, 2021.

Wen Zongguo et al., "Urban Circular Economy Development: Systematic Approach, Common Technology and ApplicationPractice", China Environment Press, 1st Edition, Oct. 31, 2015, pp. 225-226, ISBN: 9787511123220 (English translation of Abstract is submitted herewith.).
Wang Hongmei et al., "Research on Disposal Status and Management Countermeasures of Waste Battery Treatment", China Environment Press, 1st Edition, Apr. 30, 2013, p. 113, ISBN: 9787511113191 (English translation of Abstract is submitted herewith.).
Xiao Chengwei, "Electric Vehicle Engineering Handbook vol. IV Automotive Power Storage Battery", Machinery Industry Press, 1st Edition, Dec. 31, 2019, p. 391, ISBN: 9787111640189 (English translation of Abstract is submitted herewith.).
Nanjing Institute of Chemical Technology et al., "Thermal Processes and Equipment for the Silicate Industry (vol. II)—Thermal Equipment for the Cement Industry", China Building Industry Press, Mar. 31, 1982, p. 21, ISBN: 9787562906940 (Anew version of this book is 'Thermal Equipment for the Cement Industry'.) (English translation of Abstract is submitted herewith.).
Office action issued on Dec. 3, 2024 from Japan Intellectual Property Office in a counterpart Japanese Patent Application No. 2022-553109 (all the cited references are listed in this IDS.) (English translation is also submitted herewith.).
Office action issued on Nov. 8, 2025 from China Patent Office in a counterpart China Patent Application No. 202511020478.5(all the cited references are listed in this IDS.) (English translation is also submitted herewith.).

* cited by examiner

PREPARING A PRELIMINARY CATHODE ACTIVE MATERIAL MIXTURE

S10

RECOVERING A LITHIUM PRECURSOR FROM A CATHODE ACTIVE MATERIAL MIXTURE

S30

S20

METHOD FOR RECOVERING ACTIVE METAL OF LITHIUM SECONDARY BATTERY

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/002657 filed on Mar. 4, 2021, which claims priority to the benefit of Korean Patent Application No. 10-2020-0028136 filed in the Korean Intellectual Property Office on Mar. 6, 2020, the entire contents of which are incorporated herein by reference.

BACKGROUND

1. Technical Field

The present invention relates to a method for recovering an active metal of a lithium secondary battery. More particularly, the present invention relates to a method for recovering an active metal from a cathode active material mixture obtained from a lithium secondary battery.

2. Background Art

A secondary battery which can be charged and discharged repeatedly has been widely employed in a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is actively developed and applied due to high operational voltage and energy density per unit weight, a high charging rate, a compact dimension, etc.

The lithium secondary battery may include an electrode assembly including a cathode, an anode and a separation layer (separator), and an electrolyte immersing the electrode assembly. The lithium secondary battery may further include an outer case having, e.g., a pouch shape.

A lithium metal oxide may be used as an active material for a cathode of the lithium secondary battery. The lithium metal oxide may further contain a transition metal such as nickel, cobalt, manganese, etc.

The lithium metal oxide as the cathode active material may be prepared by reacting a lithium precursor and a nickel-cobalt-manganese (NCM) precursor containing nickel, cobalt and manganese.

As the above-mentioned high-cost valuable metals are used for the cathode active material, an excessively high cost is required for manufacturing the cathode material. Additionally, as environment protection issues have recently been highlighted, a recycling method of the cathode active material is being researched. A generation of the lithium precursor with high efficiency and high purity from a waste cathode is required for the recycle of the cathode active material For example, Korean Published Patent Application No. 2015-0002963 discloses a method of recovering lithium using a wet method. However, lithium is recovered by a wet extraction from a waste liquid remaining after extracting cobalt, nickel, etc., and thus a recovery ratio is excessively reduced and a large amount of impurities may be generated from the waste liquid.

SUMMARY

According to an aspect of the present invention, there is provided a method for recovering an active metal of a lithium secondary battery with high efficiency and high yield.

In a method for recovering an active metal of a lithium secondary battery, a preliminary cathode active material mixture including a lithium composite oxide and a binder may be prepared. A cathode active material mixture may be formed by removing the binder from the preliminary cathode active material mixture through a heat treatment in a fluidized bed reactor. A lithium precursor may be recovered from the cathode active material mixture.

In some embodiments, preparing the preliminary cathode active material mixture may include removing elements of a current collector by a physical pre-treatment from a cathode including the cathode current collector and a cathode active material layer.

In some embodiments, forming the cathode active material mixture may include injecting a non-reactive fluidizing gas into the fluidized bed reactor.

In some embodiments, the non-reactive fluidizing gas may include at least one selected from the group consisting of helium (He), nitrogen ($N_2$), neon (Ne), argon (Ar), krypton (Kr) and xenon (Xe).

In some embodiments, the heat treatment may be performed at a temperature in a range from 100 to 550° C.

In some embodiments, the binder may be decomposed through the heat treatment, and a temperature increase in the fluidized bed reactor by the decomposition of the binder may be 15° C. or less.

In some embodiments, the preliminary cathode active material mixture may further include a carbon-based conductive material, and the conductive material may be also removed through the heat treatment in the fluidized bed reactor.

In some embodiments, recovering the lithium precursor may include forming an active metal precursor mixture including a lithium precursor and a transition metal precursor by a reductive treatment of the cathode active material mixture, and collecting the lithium precursor from the active metal precursor mixture.

In some embodiments, the reductive treatment may be performed at a temperature in a range from 300 to 700° C.

In some embodiments, the reductive treatment may be performed in the fluidized bed reactor used in forming the cathode active material mixture.

In some embodiments, collecting the lithium precursor may include washing the active metal precursor mixture with water.

In a method of recovering an active metal of a lithium secondary battery according to the above-described exemplary embodiments, a binder included in a preliminary cathode active material mixture may be removed through a heat treatment in a fluidized bed reactor, and a side reaction caused by a heat of decomposition generated while the binder is decomposed (e.g., a particle agglomeration due to an excessive reduction of active metals, etc.) may be minimized.

In a method of recovering an active metal of a lithium secondary battery according to the above-described exemplary embodiments, a reduced cathode active material mixture may be easily recovered in a slurry state. Accordingly, a recovery efficiency of the active metal recovery process of the lithium secondary battery may be improved.

BRIEF DESCRIPTIONS OF THE DRAWINGS

Figure 2:
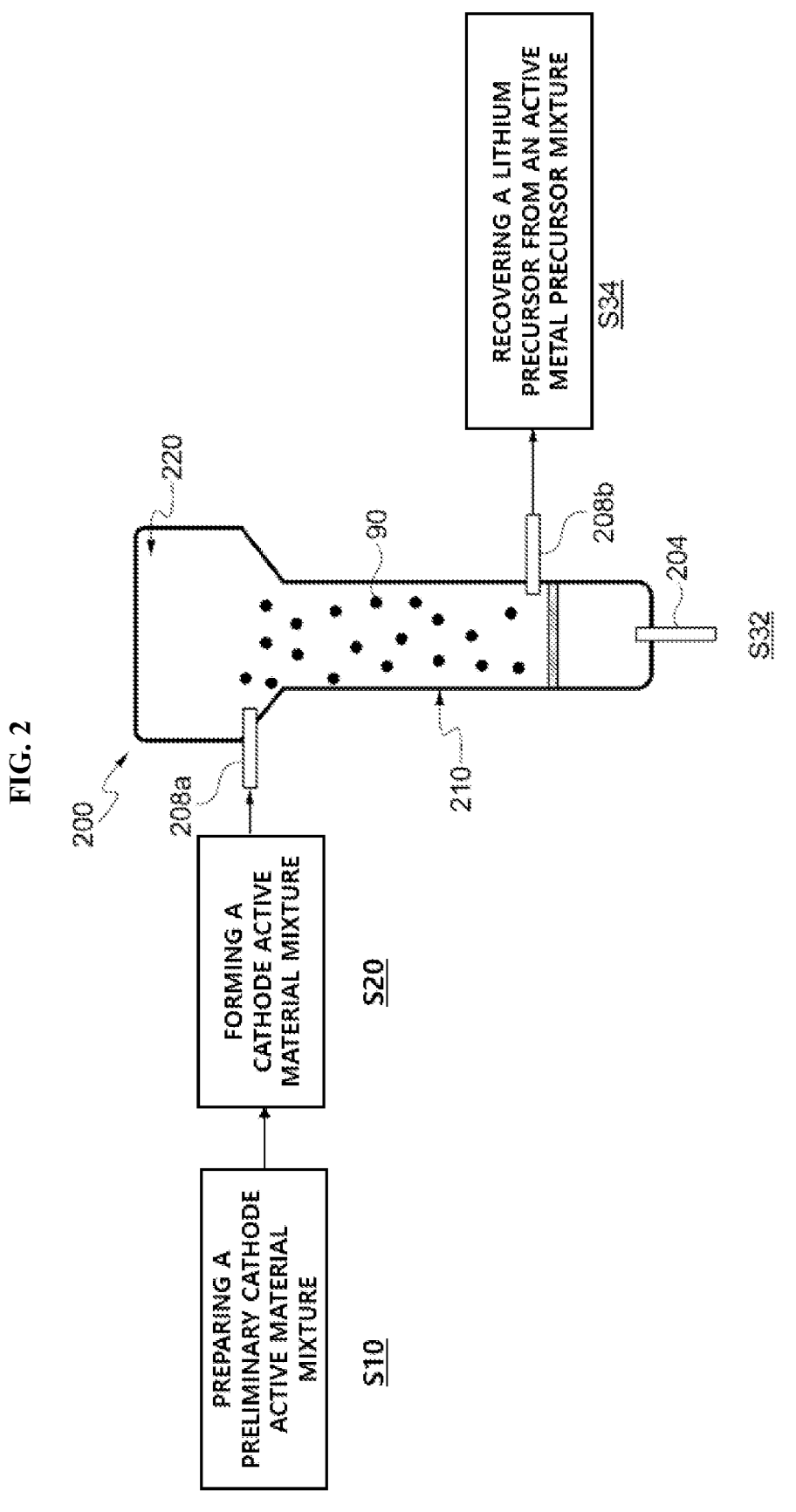

FIGS. 1 and 2 are schematic flow diagrams for describing a method of recovering an active metal of a lithium secondary battery in accordance with exemplary embodiments.

DETAILED DESCRIPTION

Embodiments of the present invention provide a recovery method of a lithium precursor in which a preliminary cathode active material mixture including a lithium composite oxide and a binder is prepared, the binder is removed from the preliminary cathode active material mixture by a heat treatment in a fluidized bed reactor to form a cathode active material mixture, and the lithium precursor is recovered from the cathode active material mixture Hereinafter, embodiments of the present invention will be described in detail with reference to the accompanying drawings. However, the embodiments are provided as examples and the present invention is not limited to the specific embodiments described herein.

As used herein, the term "precursor" is used to comprehensively refer to a compound including a specific metal to provide the specific metal included in an electrode active material.

FIGS. 1 and 2 are schematic flow diagrams for describing a method of recovering a lithium precursor of a lithium secondary battery in accordance with exemplary embodiments.

Referring to FIG. 1, a preliminary cathode active material mixture including a lithium composite oxide and a binder may be prepared (e.g., in a step S10).

In exemplary embodiments, a preliminary cathode active material mixture including a lithium composite oxide and a binder may be prepared from a lithium secondary battery.

The lithium secondary battery may include an electrode assembly including a cathode, an anode and a separation layer interposed between the cathode and the anode. The cathode and the anode may include a cathode active material layer and an anode active material layer coated on a cathode current collector and an anode current collector, respectively.

For example, the cathode active material included in the cathode active material layer may include a lithium composite oxide containing lithium and a transition metal.

In some embodiments, the lithium composite oxide may include a compound represented by Chemical Formula 1 below.

$$Li_xM1_aM2_bM3_cO_y \qquad \text{[Chemical Formula 1]}$$

In Chemical Formula 1, M1, M2 and M3 may include at least one element selected from Ni, Co, Mn, Na, Mg, Ca, Ti, V, Cr, Cu, Zn, Ge, Sr, Ag, Ba, Zr, Nb, Mo, Al, Ga and B. In Chemical Formula 1, $0<x\leq1.1$, $2\leq y\leq2.02$, $0<a<1$, $0<b<1$, $0<c<1$, and $0<a+b+c\leq1$.

In some embodiments, the cathode active material may be an NCM-based lithium oxide including nickel, cobalt and manganese. The NCM-based lithium oxide as the lithium composite oxide may be prepared by reacting a lithium precursor and an NCM precursor (e.g., an NCM oxide) with each other through a co-precipitation reaction.

However, embodiments of the present invention may be commonly applied to not only the cathode material including the lithium composite oxide, but also to a lithium-containing cathode material.

For example, the cathode may be separated from the lithium secondary battery. The cathode may include the cathode current collector (e.g., aluminum (Al)) and the cathode active material layer as described above, and the cathode active material layer may include a conductive material and a binder together with the cathode active material as described above.

In some exemplary embodiments, the cathode active material mixture may further include a carbon-based conductive material and a binder in addition to the lithium composite oxide.

The carbon-based conductive material may include, e.g., a carbon-based material such as graphite, carbon black, graphene, carbon nanotube, etc.

The binder may include a resin material, e.g., vinylidene-fluoride-hexafluoropropylene copolymer (PVDF-co-HFP), polyvinylidenefluoride (PVDF), polyacrylonitrile, polymethylmethacrylate, etc.

A preliminary cathode active material mixture may be prepared from the recovered cathode. In some embodiments, the preliminary cathode active material mixture may be prepared in a powder form from which elements of the current collector may be removed from the cathode by a physical method. For example, non-limiting examples of the physical method may include crushing, pulverization, desorption, peeling, etc.

As described above, the preliminary cathode active material mixture may include powders of the lithium composite oxide and the binder. For example, the preliminary cathode active material mixture may include an NCM-based lithium oxide powder (e.g., $Li(NCM)O_2$) and a binder powder.

In some embodiments, the recovered cathode may be heat-treated before the pulverization. Accordingly, desorption of the cathode current collector may be promoted during the pulverization, and the binder and the conductive material may be at least partially removed. For example, a temperature of the heat treatment may be in a range from about 100 to 500° C., preferably from about 350 to 450° C.

In some embodiments, the preliminary cathode active material mixture may be obtained after immersing the recovered cathode in an organic solvent. For example, the recovered cathode may be immersed in an organic solvent to separate and remove the cathode current collector, and the preliminary cathode active material mixture including the lithium composite oxide and the binder may be selectively extracted through a centrifugation.

Through the above-described processes, a cathode current collector component such as aluminum may be substantially completely separated and removed, and the preliminary cathode active material mixture having a reduced content of carbon-based components derived from the binder may be obtained.

In this case, the preliminary cathode active material mixture may further include particles derived from the carbon-based conductive material in addition to particles derived from the lithium composite oxide and the binder.

Referring to FIG. 1, a cathode active material mixture may be formed by removing the binder from the preliminary active material mixture by a heat treatment in a fluidized bed reactor (e.g., in a step S20).

For example, the preliminary cathode active material mixture 50 including the lithium composite oxide 60 and the binder 70 may be injected into the fluidized bed reactor 100.

For example, the fluidized bed reactor 100 may refer to a reactor that fluidizes the preliminary cathode active material mixture 50 by passing a fluid (a gas or a liquid) through the injected preliminary cathode active material mixture 50. For example, the fluid may be a non-reactive fluidizing gas, which will be described later.

In this case, the binder 70 may be removed while the preliminary cathode active material mixture 50 in the fluidized bed reactor 100 is in a fluidized state, so that a heat of decomposition generated in the process of removing the binder 70 may be evenly dispersed throughout the preliminary cathode active material mixture 50.

Thus, a temperature increase in the reactor due to the heat of decomposition may be minimized. Accordingly, aggregation of particles due to a side reaction (e.g., an excessive reductive reaction due to the heat of decomposition of the binder) of the preliminary cathode active material mixture 50 caused by to the heat of decomposition may be minimized.

In some exemplary embodiments, a non-reactive fluidizing gas may be injected into the fluidized bed reactor 100 to form a cathode active material.

For example, the preliminary cathode active material mixture 50 may be injected into the fluidized bed reactor 100 through an upper inlet 108*a* located at an upper portion of the fluidized bed reactor 100.

For example, the non-reactive fluidizing gas may be injected into a reactor body 110 of the fluidized bed reactor 100 through a gas inlet 104 located at a lower portion of the fluidized bed reactor 100.

The non-reactive fluidizing gas may include at least one selected from the group consisting of helium (He), nitrogen ($N_2$), neon (Ne), argon (Ar), krypton (Kr) and xenon (Xe).

As the non-reactive fluidizing gas may be injected into the fluidized bed reactor 100, the preliminary cathode active material mixture 50 injected into the fluidized bed reactor 100 may be fluidized.

For example, the fluidized bed reactor 100 may include an expansion tube 120 having a larger diameter than that of the reactor body 110 at an upper portion thereof.

The expansion tube 120 may have a larger diameter than that of the reactor body 110, so that a flow rate of the non-reactive fluidizing gas that is injected from the lower portion of the fluidized bed reactor 100 to move upwardly may be decreased. Thus, reduction of a recovery ratio caused when the preliminary cathode active material mixture 50 flows out of the reactor body 110 due to an increase of an injection rate of the non-reactive fluidizing gas may be effectively prevented.

For example, the preliminary cathode active material mixture 50 may be fluidized after the injection into the fluidized bed reactor 100, and then the binder 70 may be removed through a heat treatment. In this case, the binder 70 may be removed from the preliminary cathode active material mixture to form a cathode active material mixture 90. The cathode active material mixture 90 may include particles derived from the lithium composite oxide 60, and may not substantially include particles derived from the binder 70.

For example, the fluidized bed reactor 100 may include a heating unit capable of controlling a temperature at an inside of the reactor body 110.

For example, a temperature of the heat treatment may be in a range from about 100 to 550° C., more preferably from about 400 to 500° C. Within the above temperature range, decomposition of the binder may be initiated while minimizing side reactions caused by the temperature increase at the inside of the reactor body 110.

For example, if the temperature of the heat treatment is less than the above range, the non-decomposed binder may remain. If the temperature of the heat treatment is beyond the above range, lithium carbonate ($Li_2CO_3$) may be formed due to an excessive reductive reaction and agglomeration of particles may be caused. Accordingly, a recovery efficiency of the lithium precursor may be degraded.

In some exemplary embodiments, the binder 70 may be decomposed by the heat treatment, and an increased amount of the temperature in the fluidized bed reactor 100 due to the decomposition of the binder 70 may be about 15° C. or less, preferably about 10° C. or less. A lower limit of the temperature increase may be advantageously small, but may be about 1° C. or more.

In this case, the decomposition of the binder 70 may be performed at the inside of the fluidized bed reactor 100, so that the decomposition heat of the binder 70 may be dispersed throughout the fluidized preliminary cathode active material mixture 50 to minimize the temperature rise due to the decomposition heat.

Thus, the side reaction of the preliminary cathode active material mixture 50 due to the decomposition of the binder 70 (e.g., the excessive reduction of the lithium composite oxide by carbon) may be minimized, so that process efficiency of the lithium precursor recovery as will be described later may be improved.

In some exemplary embodiments, the preliminary cathode active material mixture 50 may further include a carbon-based conductive material 80, and the conductive material 80 may also be removed through the heat treatment in the fluidized bed reactor 100. Accordingly, an active metal recovery efficiency of the lithium secondary battery may be further improved.

In some exemplary embodiments, an average diameter (D50, e.g., based on a cumulative volume distribution) of the formed cathode active material mixture may be in a range from about 1 to 100 μm. In the above range, a contact area between a reductive gas and the cathode active material mixture may be increased during a reductive process to be described later, and collection efficiency of the lithium precursor may be enhanced.

For example, when the formation of the cathode active material mixture 90 is performed in a non-fluidized reactor, the side reaction due to the heat of decomposition of the binder 70 (e.g., the excessive reduction by carbon) may occur in the process of removing the binder 70 from the preliminary cathode active material 50 to cause aggregation of particles included in the cathode active material mixture 90.

In this case, a diameter of the particles included in the cathode active material mixture 90 may be increased to 1 cm or more. Accordingly, fluidization of the cathode active material mixture 90 for performing a reductive reaction to be described later may not be implementable, and thus process efficiency of the reductive reaction may be degraded.

In some exemplary embodiments, a particle size distribution of the cathode active material mixture 90 may be greater than about 0 μm and about 500 μm or less.

Within the particle size distribution range, the cathode active material mixture may be entirely and uniformly reduced. Accordingly, a heat generated during the reductive reaction may be evenly dispersed throughout the cathode active material mixture, and side reactions caused by the heat generated during the reductive reaction may be minimized. Accordingly, yield of the lithium precursor may be further improved.

For example, the cathode active material mixture 90 may be collected through an outlet 108*b* of the fluidized bed reactor 100. The collected cathode active material mixture 90 may be injected into a lithium precursor recovery process as will be described later.

In an embodiment, the cathode active material mixture 90 may be maintained at the inside of the fluidized bed reactor 100, and the lithium precursor recovery process may be performed at the inside of the fluidized bed reactor 100 in which the cathode active material mixture 90 is formed.

Referring to FIGS. 1 and 2, the lithium precursor may be collected from the cathode active material mixture 90 (e.g., in a step S30).

In this case, the cathode active material mixture 90 formed in the fluidized bed reactor 100 may have a uniform particle distribution, so that the reductive process for collecting the lithium precursor may be performed, and a contact area with a reductive gas may be increased.

Further, the binder 70 having a large heat of decomposition may be removed from the cathode active material mixture 90, so that an internal temperature increase of a reductive reactor 200 by the heat generated as the binder 70 is decomposed may be minimized during the lithium precursor recovery process. Accordingly, the side reaction of the cathode active material mixture 90 (e.g., an excessive reduction of the cathode active material) due to the heat of decomposition of the binder 70 may be minimized. Thus, a collection efficiency of the lithium precursor may be improved.

The lithium precursor may include lithium hydroxide (LiOH), lithium oxide ($Li_2O$), or lithium carbonate ($Li_2CO_3$). The lithium precursor may include lithium hydroxide from aspects of charge/discharge properties, lifespan properties, high temperature stability, etc.

In an embodiment, lithium carbonate may substantially not be contained, because lithium carbonate may cause a deposition reaction on the separation layer to degrade lifespan stability.

In some embodiments, in the recovery of the lithium precursor, the cathode active material mixture 90 may be reduced to form an active metal precursor mixture including the lithium precursor and a transition metal precursor (e.g., in a step S32).

For example, the cathode active material mixture (e.g., the cathode active material) may be subjected to a reductive reaction with hydrogen in the reductive reactor 200 to form the active metal precursor mixture. Hydrogen may be injected into a reactor body 210 through a gas injector 204 located at a lower portion of the reductive reactor 200.

The hydrogen reductive reaction may be performed at a temperature from about 300 to 700° C., preferably from 400 to 550° C. In this case, the reductive reactor 200 may include a separate heating unit for increasing the internal temperature. In the above temperature range, yield of the active precursor mixture generated from the cathode active material mixture 90 may be improved.

Further, the cathode active material mixture 90 may not substantially include a binder, so that an increase of the internal temperature in the reductive reactor 200 due to the heat of decomposition of the binder may be prevented. Accordingly, excessive reduction of the cathode active material mixture 90 due to the heat of decomposition may be prevented, thereby minimizing aggregation of particles due to a bonding between nickel (Ni) and cobalt (Co) included in the cathode active material mixture 90. Additionally, the active metal precursor mixture formed by reducing the cathode active material mixture 90 may be more easily collected in a slurry state.

An additional increase of the temperature in the reduction reactor 200 by the hydrogen reductive reaction may be about 30° C., preferably about 25° C. or less. A lower limit of the additional temperature increase is not particularly limited, but may be about 1° C. or higher.

In some exemplary embodiments, the reductive reactor 200 may be a fluidized bed reactor. In this case, hydrogen and the non-reactive fluidizing gas may be injected together through the gas inlet located at the lower portion of the fluidized bed reactor.

For example, an expansion tube 220 may be located at an upper portion of the reductive reactor 200. A flow rate of the non-reactive fluidizing gas injected from the lower portion of the reduction reactor 200 may be decreased by the expansion tube 220 so that leakage of the cathode active material mixture 90 may be effectively prevented in the process of fluidizing the cathode active material mixture 90.

The active precursor mixture may include a preliminary lithium precursor and a preliminary transition metal precursor, which may be products of the hydrogen reductive reaction of the lithium composite oxide included in the cathode active material mixture.

The preliminary lithium precursor may include lithium hydroxide, lithium oxide and/or lithium carbonate. In exemplary embodiments, the preliminary lithium precursor may be obtained through the hydrogen reductive reaction, so that a mixed content of lithium carbonate may be lowered.

The preliminary transition metal precursor may include Ni, Co, NiO, CoO, MnO, etc.

For example, the active precursor mixture may be formed from the reduction of the cathode active material mixture 90 that may not substantially include the binder, and thus a nickel (Ni)-cobalt (Co) bond formed by an excessive reduction of the cathode active material mixture 90 may not be substantially included. Thus, the active precursor mixture may be more easily recovered in a slurry state.

In some exemplary embodiments, the reductive reaction may be performed at an inside of the fluidized bed reactor 100 in which the process of forming the cathode active material mixture is performed. In this case, the formation of the cathode active material mixture and the reductive reaction may be performed in the same reactor, so that a partial loss of the cathode active material mixture caused during a transfer of the formed cathode active material mixture may be prevented. Accordingly, a recovery efficiency of the lithium precursor may be further improved.

In some exemplary embodiments, the cathode active material mixture 90 may be injected into the reductive reactor 200 through an upper inlet 208*a* located at an upper portion of the reductive reactor 200. The active metal precursor mixture may be collected through an outlet 208*b* located at a lower portion of the reductive reactor 200. The collected active metal precursor mixture may be injected into a lithium precursor collection process to be described later.

For example, water and a non-reactive fluidizing gas may be injected into the reductive reactor 200 before collecting the active metal precursor mixture to form the active metal precursor mixture into a slurry state. In this case, aggregation of the active metal precursor mixture caused by the reductive reaction may be released. Thus, the active metal precursor mixture may be more easily collected in the slurry state.

For example, water may be injected into the reductive reactor 200 through the upper inlet 208a of the reductive reactor 200, and the non-reactive fluidizing gas may be injected into the reductive reactor 200 through a gas inlet 204 located at a bottom of the reductive reactor 200.

For example, the active metal precursor mixture in the slurry state may be collected through the outlet 208b located at a lower portion of the reductive reactor 200.

In an embodiment, the formed active metal precursor mixture may not be separately collected from the reductive reactor 200, but may be located within the reductive reactor 200 and a lithium precursor collection process to be described later may be performed within the reductive reactor 200.

In some exemplary embodiments, the lithium precursor may be collected from the active metal precursor mixture (e.g., in a step S34).

For example, the lithium precursor may be collected by reacting the active metal precursor mixture formed from the hydrogen reductive reaction as described above with a leaching liquid.

For example, the active metal precursor mixture may react with the leaching liquid to form a solution in which the lithium precursor is dissolved and a precipitate of the preliminary transition metal precursor.

For example, lithium oxide reacts with the leaching liquid to form lithium hydroxide that may be dissolved in the leaching liquid.

For example, lithium carbonate may have poor solubility in the leaching liquid. Thus, lithium carbonate may be precipitated and may be removed from the preliminary precursor mixture.

In some embodiments, the leaching liquid may include water. In this case, the active metal precursor mixture may be washed with water. Through the washing treatment, the active metal precursor mixture and water may react to form the lithium precursor in which lithium hydroxide is dissolved in water.

In some exemplary embodiments, the leaching liquid may further include dimethyl carbonate or diethyl carbonate.

For example, dimethyl carbonate or diethyl carbonate may promote the reaction between the preliminary lithium precursor and water. Accordingly, the separation efficiency of the lithium precursor may be improved.

In some embodiments, the precipitate may include a slurry including the preliminary lithium precursor mixture.

For example, the preliminary transition metal precursor that may not be dissolved in the leaching liquid may be dispersed in the leaching liquid to form the slurry. Accordingly, the lithium precursor may be collected by separating the slurry from the solution in which the lithium precursor is dissolved.

In an embodiment, the precipitated preliminary transition metal precursor may be collected to form a transition metal precursor. For example, the preliminary transition metal precursor may be reacted with an acidic solution to form the transition metal precursor.

In an embodiment, sulfuric acid may be used as the acidic solution. In this case, the transition metal precursor may include a transition metal sulfate. For example, the transition metal sulfate may include $NiSO_4$, $MnSO_4$, $CoSO_4$, etc.

The reaction of the preliminary precursor mixture and the leaching liquid may be performed in the reductive reactor 200 in which the hydrogen reductive process is performed or in the fluidized bed reactor 100 in which the cathode active material mixture forming process is performed. In this case, collection processes for each product after the process for forming the cathode active material mixture, the process of forming the preliminary lithium precursor, or the process for forming the precursor mixture may not be required so that a degradation of a recovery ratio of the lithium precursor caused during a transfer process of each product may be minimized.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

1 kg of a cathode material separated from a waste lithium secondary battery was cut into small units, and pulverized by milling to form a preliminary cathode active material mixture containing a Li—Ni—Co—Mn oxide and a binder (polyvinylidene fluoride, PVDF).

0.2 kg of the preliminary cathode active material mixture was injected into a fluidized bed reactor. $N_2$ gas was injected into a lower portion of the fluidized bed reactor to fluidize the preliminary cathode active material mixture, and an internal temperature of the fluidized bed reactor was increased to 450° C. to thermally decompose the binder included in the preliminary cathode active material mixture, thereby preparing a cathode active material mixture.

The cathode active material mixture was fluidized in the fluidized bed reactor and reacted with a hydrogen gas to form an active metal precursor mixture including lithium hydroxide. The internal temperature of the fluidized bed reactor was maintained at 450° C.

Water and nitrogen were added to the active metal precursor to form an active metal precursor in a slurry state. The active metal precursor in the slurry state was collected and washed with water to obtain an aqueous lithium precursor solution.

Comparative Example 1

A lithium precursor was obtained by the same method as that in Example 1, except that a thermal decomposition process of the binder for preparing the cathode active material mixture was performed using a non-fluidization reactor.

Comparative Example 2

A lithium precursor was obtained by the same manner as that in Example 1, except that the thermal decomposition process of the binder was not performed while preparing the cathode active material mixture.

For each of Example 1, and Comparative Examples 1 and 2, a change of the internal temperature (° C.) in the fluidized bed reactor, an average diameter of the cathode active material mixture particles, a particle size distribution, generation of by-products, and a binder removal ratio measured during the cathode active material mixture process are shown in Table 1.

Additionally, a maximum change of the temperature in the reactor during the reductive process and a recovery ratio of the lithium precursor after washing with water were measured and shown in Table 1.

TABLE 1

| Category | | Example 1 | Comparative Example 1 | Comparative Example 2 |
|---|---|---|---|---|
| cathode active material formation | temperature change (° C.) | 12 | 300 | — |
| | average diameter (μm) | 13 | 50000 | 70 |
| | particle diameter distribution (μm) | 0~300 | 0~50000 | 0~300 |
| | binder removal ratio | 95 | 70 | 0 |
| temperature change in reductive process (° C.) | | 23 | — | 120 |
| recovery ratio of lithium precursor | | 90 | 10 | 60 |

Referring to Table 1, in Example 1 where the fluidization thermal decomposition process was performed to remove the binder included in the preliminary cathode active material mixture, improved lithium precursor recovery ratio was achieved.

However, in Comparative Example 1 where the non-fluidization thermal decomposition process was performed, the cathode active material mixture was aggregated each other by a side reaction (e.g., an excessive reduction) in the thermal decomposition process. As a result, the cathode active material mixture was not easily fluidized, thereby degrading efficiency of the hydrogen reductive process.

Further, in Comparative Example 2 where the thermal decomposition process was not performed, the metal active material mixture was aggregated by a side reaction (e.g., an excessive reduction of the cathode active material mixture) due to a heat of decomposition caused by the decomposition of the binder during the hydrogen reductive process. Accordingly, the over-reduced metal active material mixture was not easily transformed into a slurry state, thereby lowering the recovery ratio of the lithium precursor.

What is claimed is:

1. A method for recovering an active metal of a lithium secondary battery, comprising:

preparing a preliminary cathode active material mixture including a lithium composite oxide and a binder;

forming a cathode active material mixture by removing the binder from the preliminary cathode active material mixture through a heat treatment in a fluidized bed reactor; and recovering a lithium precursor from the cathode active material mixture, wherein forming the cathode active material mixture comprises injecting a fluidizing gas including only a non-reactive fluidizing gas into the fluidized bed reactor.

2. The method for recovering an active metal of a lithium secondary battery of claim 1, wherein preparing the preliminary cathode active material mixture comprises removing elements of a current collector by a physical pre-treatment from a cathode including the cathode current collector and a cathode active material layer.

3. The method for recovering an active metal of a lithium secondary battery of claim 1, wherein the non-reactive fluidizing gas comprises at least one selected from the group consisting of helium (He), nitrogen (N2), neon (Ne), argon (Ar), krypton (Kr) and xenon (Xe).

4. The method for recovering an active metal of a lithium secondary battery of claim 1, wherein the heat treatment is performed at a temperature in a range from 100 to 550° C.

5. The method for recovering an active metal of a lithium secondary battery of claim 4, wherein the binder is decomposed through the heat treatment, and a temperature increase in the fluidized bed reactor by the decomposition of the binder is 15° C. or less.

6. The method for recovering an active metal of a lithium secondary battery of claim 1, wherein the preliminary cathode active material mixture further comprises a carbon-based conductive material, and the conductive material is also removed through the heat treatment in the fluidized bed reactor.

7. The method for recovering an active metal of a lithium secondary battery of claim 1, wherein recovering the lithium precursor comprises:

forming an active metal precursor mixture including a lithium precursor and a transition metal precursor by a reductive treatment of the cathode active material mixture; and collecting the lithium precursor from the active metal precursor mixture.

8. The method for recovering an active metal of a lithium secondary battery of claim 7, wherein the reductive treatment is performed at a temperature in a range from 300 to 700° C.

9. The method for recovering an active metal of a lithium secondary battery of claim 7, wherein the reductive treatment is performed in the fluidized bed reactor used in forming the cathode active material mixture.

10. The method for recovering an active metal of a lithium secondary battery of claim 7, wherein collecting the lithium precursor comprises washing the active metal precursor mixture with water.

* * * * *